Dec. 17, 1946.  J. A. HOFFMAN ET AL  2,412,685
CONDUIT COUPLING
Filed April 22, 1944  2 Sheets-Sheet 1

INVENTORS
JAMES A. HOFFMAN
SAMUEL R. OLDHAM
WILGOT J. JACOBSSON
BY
ATTORNEY

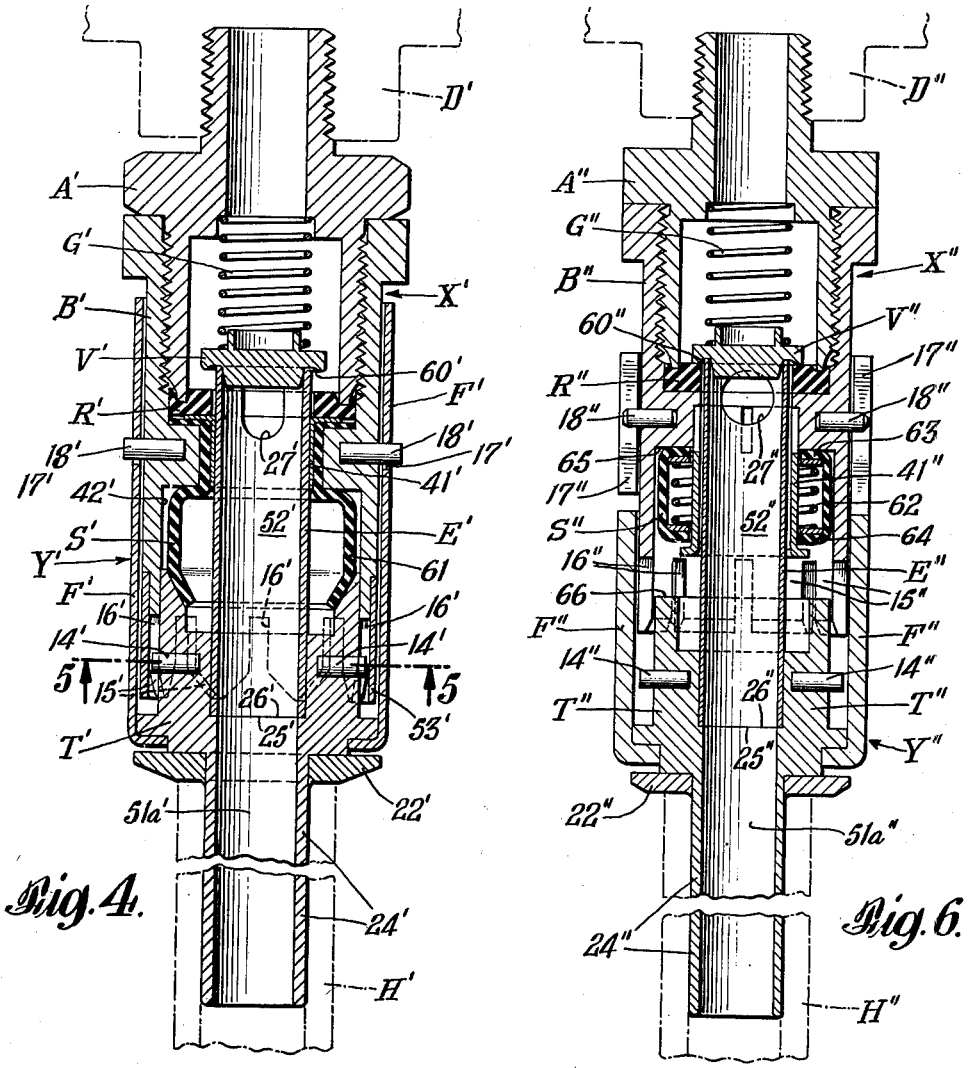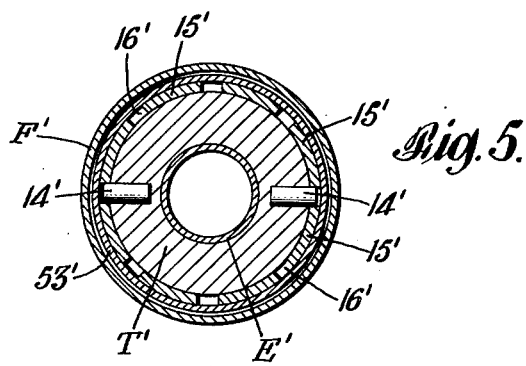

Patented Dec. 17, 1946

2,412,685

UNITED STATES PATENT OFFICE 2,412,685

CONDUIT COUPLING

James Arthur Hoffman, Roselle, Samuel R. Oldham, West Orange, and Wilgot J. Jacobsson, Plainfield, N. J., assignors to The Linde Air Products Company, New York, N. Y., a corporation of Ohio Application April 22, 1944, Serial No. 532,264

16 Claims. (Cl. 284—19)

This invention relates to conduit couplings, and more particularly to an improved conduit coupling of the socket-and-plug pressure-sealed type especially adapted for readily connecting and disconnecting a hose and a fluid supply device.

In conjunction with breathing equipment used on airplanes, for example, it is essential that the means for coupling every individual oxygen supply hose to the supply of oxygen under pressure shall be quickly attachable to the oxygen supply device and dependable to deliver the oxygen whenever it is needed; shall provide a seal within the coupling that is reliable over a wide range of applied gas pressures and under widely varying temperatures; and shall not kink or twist the gas hose that delivers the oxygen for breathing.

The principal object of this invention is to provide a conduit coupling which meets the foregoing requirements and yet is comparatively inexpensive to manufacture and install, and easy to manipulate. These and other objects, and the novel features of the invention, will become apparent from the following description and the accompanying drawings in which:

Fig. 4 is a central longitudinal sectional view of a modification of the invention.

Fig. 5 is a cross-sectional view taken on line 5—5 of Fig. 4; and

Fig. 6 is a central longitudinal sectional view of another modification, the units being shown partially uncoupled.

Figure 1:
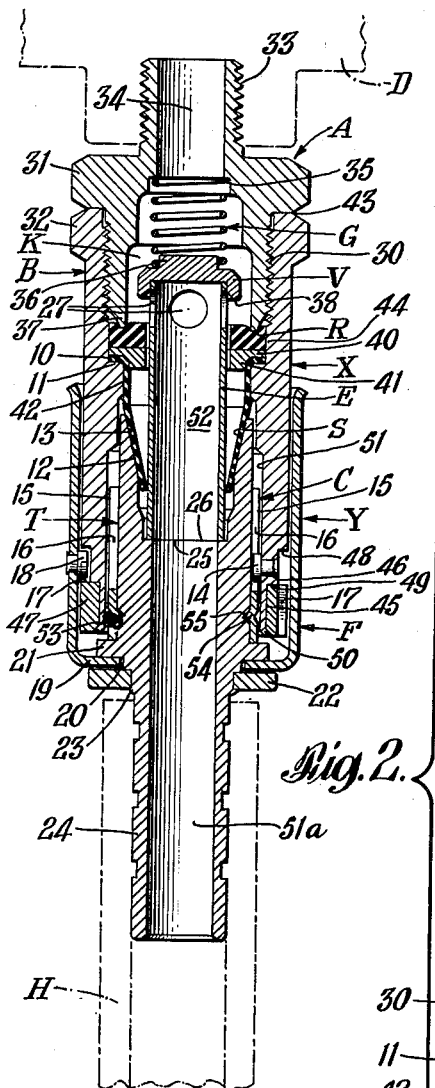
Fig. 1 is a central longitudinal sectional view of a conduit coupling embodying the principles of this invention.
Figure 2:
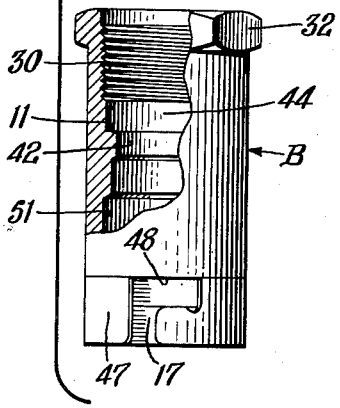
Fig. 2 is an exploded view mainly in side elevation of the parts of the plug conduit unit of such coupling.
Figure 3:
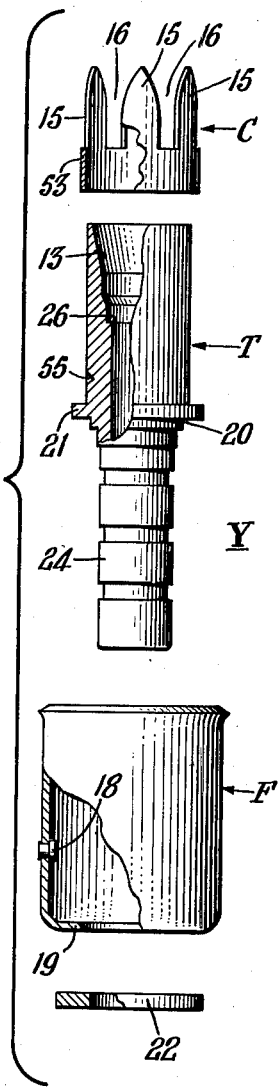
Fig. 3 is a view similar to Fig. 2, of the parts of the socket conduit unit shown in Fig. 1.

Generally speaking, and referring to Figs. 1, 2 and 3 which illustrate a preferred embodiment of the invention, the improved conduit coupling comprises a plug conduit unit X having one end thereof constructed so as to telescope axially into and releasably interlock with a mating socket conduit unit Y, to provide a fluid passage through the coupling, which passage is effectively sealed against fluid leakage to the atmosphere. The fluid-pressure sealing means includes a substantially tubular or conical membranous element S, desirably formed of anode rubber or other suitable elastic or resilient material, which is arranged coaxially within and has an annular flange 10 at one end thereof clamped in sealing contact with an inner annular surface or shoulder 11 of one of the coupling units, e. g., the plug unit X. An annular tapered or frusto-conical free wall portion 12 adjacent the other end of the tubular sealing membrane or element S is arranged to engage and fit an annular or conical internal seat 13 on the other coupling unit, e. g., the socket unit Y; the construction being such that the pressure of the fluid such as oxygen flowing through the coupling and into the resilient sealing element S will maintain a fluid-tight or sealed joint between the tubular sealing membrane S and the annular seat 13 along their mutually contacting surfaces.

The annular seat 13 desirably is formed internally adjacent the end of a metal tube T constituting a part of one of the coupling units, e. g., the socket unit Y; and, in order to prevent damage to the delicate sealing element S while connecting or disconnecting the coupling units, the metal tube T is locked or secured against rotation about its axis and relatively to the sealing element S when the latter engages the annular seat 13. This locking function desirably is accomplished by cooperating positioning and interlocking means on the two conduit units, which means may consist of a pin 14 carried by one of the units, e. g., the plug unit X, and a crown C comprising a circular row of spaced-apart fingers 15 secured to the other unit, e. g., the tube T of the socket unit Y, to provide a row of open-ended slots 16, any one of which may receive the pin 14 endwise therein when the units X and Y are telescoped axially relatively to one another to connect them together.

To provide a readily connectible and disconnectible union, the two units X and Y desirably are additionally provided with pin-and-slot or bayonet-type connecting means, manually operable with the aid of a spring G to releasably lock the units in telescoped relation, securing them against axial relative movement except against the force of said spring G. One of the units, e. g., the plug unit, may be provided with two diametrically opposite L-shaped slots 17, either of which receives a pin 18 carried by the other unit, e. g., the socket unit. This pin 18 desirably is carried by a sleeve or ferrule F secured but rotatable relatively to the tube T. The sleeve F is concentrically connected to the exterior of the tube T intermediate the ends of the latter, as by an inturned flange 19 on the sleeve fitting slidably within a circumferential groove 20 formed between an annular flange 21 on the tube T and a ring 22 secured to the tube T by an outwardly-spun bead 23. Thus, the part of the tube T provided with the internal annular seat 13 is within the sleeve F and a part 24 of the tube projects outside the sleeve.

The external tube part 24 is designed to be fit into and non-rotatably secured to a hose H or similar conduit; and, by virtue of the rotatable connection between the tube T and the sleeve F, the latter may be turned about its axis independently of the tube and the hose both before and after the tube T is locked against rotary movement in sealing position with respect to the sealing element S in the plug unit. Thus, damage to the sealing element S and also kinking or twisting of the hose H is prevented when the sleeve is turned to position to interlock the pin 18 thereon with one of the bayonet slots 17 on the plug unit.

A normally-closed valve is included in one of the conduit units and is constructed and arranged to be actuated and opened by the other conduit unit when the two units are coupled together. As shown, the plug unit X contains a disc-type valve V normally held by the coil spring G, assisted by the fluid pressure, against an annular valve seat R of suitable yieldable material, and a tubular valve stem E secured to the valve V extends axially through the coaxially arranged seat R and sealing element S, so that the free annular end 25 of the valve stem will be engageable by an internal annular shoulder 26 on the tube T, to push the valve V axially off the seat R when the units are coupled together. Thus fluid may flow through four radial holes 27 provided in the valve stem E adjacent the valve V, causing the application of fluid pressure against the inside of the resilient sealing element S to provide a fluid-tight seal between the conical end portion 12 and the seat 13.

The plug unit X desirably includes a two-piece generally tubular casing comprising a nipple A and a shell B detachably connected together by interfitting threads at 30, and hexagonal wrench heads are provided at 31 and 32 to aid in tightly securing them together, to separate them, and to secure this unit to a fitting. The outer end of the nipple A has an externally threaded boss 33 adapted rigidly to secure the plug unit to a fluid conduit, such as the internally threaded outlet of an oxygen supply fitting D; and a fluid inlet passage 34 in the boss 33 opens into a valve chamber K in the nipple. The valve centering and closing spring G bears at one end against a shoulder 35 at the bottom of the chamber K, and its other end fits around a boss 36 on the rear of the valve and bears against the latter.

The inner end of the nipple A has an axially extending annular lip or flange 37 arranged sealingly to engage the annular valve seat R outside the area thereon that is engaged by an annular seating face or edge 38 of the valve V. An annular spacer 40 composed of rigid material such as metal having substantially the same inside and outside diameters as the seat R, is located between the latter and the flange 10 of the sealing element S. The spacer 40 has a flange or annular extension 41 at its inner edge which projects into the sealing element S and supports the latter internally. At least a part of the elastic sealing element S, which desirably is substantially of frusto-conical shape, engages and is externally supported by a smooth section or portion 42 of the interior surface of the shell B.

When the nipple A and shell B are screwed together and in contact at 43, the lip 37 of the nipple presses into the seat R and, through the spacer 40, presses the flange 10 against the shoulder 11, while a cylindrical surface portion 44 of the shell B contacts with and holds these parts radially in place. When the seat R, the spacer 40 and the flange 10 are thus clamped in position, all joints between them and the casing sections A and B are effectively sealed, and the valve seat R cooperates with both the lip 37 and the face 38 of the valve V, to seal the chamber K when the valve is closed.

The bayonet slots 17 at the front end of the plug unit may be formed in any suitable manner, as by turning down two stepped circumferential sections 45 and 46 on the exterior of the shell B adjacent its front end and then providing such stepped sections with an interiorly reversely stepped ring 47, the latter being secured in place against the inner shoulders 48 and 49 by spinning outwardly the extreme end portion of the shell to overhang and engage the outer edge of stepped ring 47, as at 50. Before securing the stepped ring 47 in place, its rear edge is appropriately recessed and notched at diametrically opposite sides to provide the circumferentially extending portions of the bayonet slots 17, and notches are cut from the front edge perpendicularly to the recesses to provide the entrances of the bayonet slots 17. The pin 14, which cooperates with the fingers 15 and slots 16 of the socket unit Y to locate and lock the coupling units in telescoped relation, may be secured to the shell B by riveting its shank in a hole extending through the stepped section 46, so that the head of the pin 14 will be located in and be about the same height as the increased diameter of a counterbore 51 in the shell B.

The tube T of the socket unit Y has a fluid passage 51a which has the same diameter as fluid passage 52 through the tubular valve stem E, and is coaxial therewith when the end 25 of the stem E engages the shoulder 26 to unseat the valve V. The tapered internal seat 13 of the tube T is formed by counterboring the tube on a long taper to fit an extended area of the outer substantially conical surface of the sealing element S.

The locating and locking fingers 15 and slots 16 on the tube T may be provided by cutting the longitudinal slots lengthwise into a tubular metal piece C in such manner as to leave a circular row of spaced-apart arrow-shaped or pointed fingers 15 and also to leave a cylindrical band 53 closing the inner ends of the slots 16 and connecting the fingers 15 together but in spaced relation to one another. This crown or finger-slot assembly C is substantially the same thickness as the height of the head of the pin 14, and said assembly may be rigidly and non-rotatably staked or secured to the outside of the tube T by driving diametrically opposite projections 54 on the band 53 into correspondingly located recesses 55 in the outer surface of the tube T.

The head of the pin 14 desirably is rounded or circular and, when telescopically coupling the units X and Y, first engages the pointed end of any one of the fingers 15 to smoothly position the units circumferentially relatively to one another and to preliminarily non-rotatably lock the tube T relatively to the sealing element S in such manner that the sleeve F may be rotated, without rotating the tube T, to locate the head of pin 18 on the inside of the sleeve opposite the entrance of one of the bayonet slots 17. Thereupon, the units may be telescoped into their final coupled position and the pin 14 pushed farther into the slot 16 with which it has registered, after which the sleeve F may again be rotated independently of the tube T to seat the pin 18 in the circumferential part of the bayonet slot which it entered to effectively releasably lock the two units in coupled relation, the spring G cooperating to retain the units in such locked relation.

The improved conduit couplings illustrated in Figs. 4, 5 and 6 also embody principles of this invention and, except for the major differences to be described below, are structurally similar to the preferred form of coupling illustrated in Figs. 1, 2 and 3.

In Figs. 4 and 6, respectively, the ends of tubular stems E' and E'' for unseating the valves V' and V'' are secured axially within the tubes T' and T'' at 25', 26', and 25'', 26''; and the other ends of these stems E' and E'' engage in grooves 60', 60'' in the faces of the valves when unseating the latter. Short tubes 41' and 41'' near the valve seats R' and R'' are arranged slidingly to engage the outer surfaces of the stems E' and E'', to guide the latter and prevent damage to the sealing elements S' and S'' by the stems E' and E''.

In Fig. 4, the tubular elastic fluid-pressure sealing element S' has a cylindrical section 61 to fit the interior cylindrical surface 42' of smaller diameter than the surface 42, to yieldingly hold the tubular part 41' in place and to provide increased sealing area.

In Fig. 6, the tubular elastic sealing element S'' is shown as an annular channel facing the tubular part 41'', to enclose a helical spring 62 that bears against and normally spreads apart opposite annular limbs or flanges 63 and 64 of the element S''. The limb 63 makes sealing contact with the shoulder 65 in the shell B'', and the end 66 of the tube T'' engages the limb 64 and compresses the spring 62, to provide an effective fluid-tight joint when the coupling units are telescoped together.

In both Figs. 4 and 6, the means for locating and locking the tubes T' and T'' relatively to the sealing elements S' and S'' are reversed with respect to the corresponding locating and locking means shown in Fig. 1; and the bayonet connections of the sleeves F' and F'' to the shells B' and B'' also are reversed with respect to the corresponding bayonet connection of Fig. 1. In Fig. 4, the tube T' has diametrically opposite pins 14', 14' arranged to slide into any two diametrically opposite slots 16', 16' between pointed fingers 15' within a cylindrical piece 53' secured around the front end of the shell B'. Similarly, the tube T'' carries diametrically opposite radially projecting pins 14'', 14'' arranged to slide into any two diametrically opposite slots 16'', 16'' between a row of spaced-apart pointed fingers 15'' formed integral with the front end of the shell B''. In both Figs. 4 and 6, respectively, the shells B' and B'' carry diametrically opposite radial pins 18', 18' and 18'', 18'' arranged to engage in and cooperate with pairs of bayonet slots 17' and 17'' in the sleeves F' and F'', to releasably lock the two units X' Y' and X'' Y'' in fully telescoped relation.

While several embodiments have been disclosed herein to illustrate the principles of this invention, it will be evident that numerous changes in the details of construction and arrangement of parts are possible without departing from the principles of the invention or sacrificing its advantages. Furthermore, it will be understood that certain features of the invention may be used without other features, as, for example, a coupling without a valve may be constructed according to this invention, or a valved coupling without the improved sealing means and seat therefor may be constructed according to this invention. While, in the couplings herein illustrated, the plug unit constitutes the fluid inlet and the socket unit constitutes the fluid outlet, it will be understood that the principles of the invention are equally applicable to a coupling wherein the valve V and its seat R as well as the sealing element S are located in the socket unit and the seat 13 is located in the plug unit, to provide a coupling wherein fluid enters through the socket unit and discharges through the plug unit. The couplings of the invention may be used to conduct any fluid under pressure, especially gases such as oxygen, air, acetylene or rare gases.

What is claimed is:

1. A conduit coupling comprising, in combination, a socket conduit unit; a plug conduit unit readily attachable to and detachable from said socket unit; one of such units including a substantially tubular casing and a tubular elastic sealing element having one end thereof in sealing contact with the interior surface of said casing; the other of such units including a tube having an annular seat adapted to engage an annular portion adjacent the other end of said sealing element to provide a fluid-tight joint between said sealing element and said tube when said socket unit is attached to said plug unit; said units having cooperating interlocking means operable to prevent rotation of said tube relatively to said sealing element when the latter engages said seat.

2. A conduit coupling comprising, in combination, a substantially tubular casing; a tubular elastic sealing element in said casing; a tube having an annular seat adapted to engage an annular portion of said sealing element to provide a fluid-tight joint; a sleeve telescopically fitting said casing and secured to and rotatable relatively to said tube; cooperating means on said casing and said sleeve to couple said casing and said sleeve in telescopic relation and to hold said seat against said sealing element; and means to prevent rotation of said tube relatively to said sealing element when the latter engages said seat.

3. A conduit coupling comprising, in combination, a substantially tubular casing; a tubular elastic sealing element in said casing; an annular valve seat in said casing; a valve normally spring-pressed against said valve seat and having a tubular valve stem extending into said tubular sealing element; a tube having an annular surface adapted to engage an annular portion of said sealing element to provide a fluid-tight joint, and also having means adapted to engage said valve stem to push said valve away from said valve seat and open said valve; a sleeve telescopically fitting an exterior portion of said casing and secured to and rotatable relatively to said tube; pin-and-slot means on said casing and said sleeve to couple said casing and said sleeve in telescopic relation and also to hold said tube in position to press said annular surface against said sealing element and to open said valve; and longitudinally-interlocking means on said casing and said tube to prevent rotation of said tube relatively to said sealing element when said annular surface engages said sealing element.

4. A conduit coupling unit comprising, in combination, a shell having an internal annular shoulder, a nipple removably secured in said shell, said nipple having an axially projecting annular flange, a tubular fluid pressure sealing element having an annular flange at one end seated on said annular shoulder, an annular spacer, an annular valve seat, said valve seat and spacer being disposed between the flange of said sealing element and the flange of said nipple and secured in place in said shell thereby, a valve in said nipple, and a spring in said nipple urging said valve toward said valve seat.

5. A fluid pressure-sealed coupling comprising in combination, a pair of conduit units, crown and pin means acting to secure parts of said units against relative rotary movement, pin and slot means acting releasably to lock said units together, the parts of said units which are secured and locked by said means comprising a tubular fluid-pressure sealing membrane composed of delicate resilient material carried by one unit, and a tubular seating member for said membrane carried by the other unit, the construction and arrangement of the combination being such that said crown and pin means axially guide said units and thereby prevent any relative rotary movement between said tubular fluid-pressure sealing membrane and said seating member when they are unlocked and uncoupled.

6. A fluid pressure-sealed coupling as defined by claim 5, in which said fluid-pressure sealing membrane has a conical free wall portion adapted to form a fluid-tight seal with a correspondingly shaped seat on said seating member.

7. A fluid pressure-sealed coupling as defined by claim 5, in which said fluid-pressure sealing membrane has a cylindrical body portion and free end portion, said portions both being adapted to expand to form fluid-tight seals with correspondingly shaped seats surrounding such portions when said units are coupled together.

8. A fluid pressure-sealed coupling as defined by claim 5, in which said fluid-pressure sealing membrane is in the form of a cylinder having radially extending annular flanges at each end, a helical spring surrounding such cylinder and yieldingly resisting axial compression of said fluid-pressure sealing membrane as said units are coupled together.

9. A conduit coupling comprising, in combination, a plug conduit unit including a tubular fluid-pressure sealing membrane therein; a socket conduit unit readily attachable to and detachable from said plug unit, said socket unit including a tube extending into said plug unit and having an internal annular seat within a bore of said tube in the plug unit and engageable by an external annular end portion of said tubular fluid-pressure sealing membrane; said units including cooperating means to prevent rotation of said tube relatively to said tubular fluid pressure sealing membrane when said external annular end portion engages said internal annular seat.

10. A conduit coupling comprising, in combination, a plug conduit unit including an elongated tubular fluid-pressure sealing membrane therein; a socket conduit unit readily attachable to and detachable from said plug unit, said socket unit including a tube extending into said plug unit and having an annular seat within the plug unit engageable by an annular end portion of said tubular fluid-pressure sealing membrane; said units including cooperating longitudinally interlocking means to prevent rotation of said tube relatively to said tubular fluid pressure sealing membrane when said annular end portion engages said annular seat, wherein said annular seat is provided by a tapered internal portion adjacent the end of said tube within the plug unit.

11. A fluid pressure-sealed type conduit coupling comprising, in combination, a plug conduit unit including an elongated tubular fluid-pressure sealing membrane therein; a socket conduit unit readily attachable to and detachable from said plug unit, said socket unit including a tube extending into said plug unit and having an annular seat within the plug unit engageable by an annular end portion of said tubular fluid-pressure sealing membrane; said units including cooperating longitudinally interlocking crown-and-pin means to prevent rotation of said tube relatively to said tubular fluid-pressure sealing membrane when said annular end portion engages said annular seat, wherein said annular seat is provided by the inner end of said tube within the plug unit.

12. A fluid pressure-sealed type conduit coupling comprising, in combination, one conduit unit including a tubular shell having on the inside thereof a threaded portion at one end, a first smooth surface portion, a shoulder facing such first smooth surface portion, a second smooth surface portion of lesser diameter than that of such first smooth surface portion, a third smooth surface portion of greater diameter than that of such second smooth surface portion, and at the other end a fourth smooth surface portion of greater diameter than that of such third smooth surface portion, a conical sealing element of resilient material having a flange seated on said shoulder and a body portion fitting such second smooth surface portion, an annular spacer engaging such flange and said body portion, an annular valve seat of flexible material mounted on said spacer, a nipple engaging the threaded portion of said tubular shell having an axially projecting annular lip at one end engaging said valve seat, said nipple having a fluid inlet at the other end, an internal spring supporting shoulder, a spring chamber, and a valve chamber, a valve disposed in such valve chamber, a coiled spring in such spring chamber resting at one end on such spring supporting shoulder and urging said valve toward said annular valve seat, and a tubular valve stem engaging said valve and extending axially through both said annular valve seat and said conical sealing element, said stem having at least one radial hole communicating with said fluid inlet when said valve is spaced from said seat, and a second conduit unit including a tube and a rotary ferrule secured to said tube, said tube being adapted to be axially inserted in the third smooth surface portion of said tubular shell, said tube having an internal conical seat adapted to fit the free end portion of said conical sealing element when said tube is inserted axially into said shell, said tube having an internal annular shoulder axially engaging said tubular valve stem against the force of said spring with said valve spaced from said annular valve seat, coacting anti-rotary telescoping means associated with the fourth smooth surface of said shell and said tube for securing said tube and shell against any relative rotary movement to protect said sealing element by keeping said conical seat from turning with respect thereto, and coacting locking means associated with said ferrule and said shell adapted with said spring to secure said units axially together.

13. A fluid pressure-sealed type conduit coupling comprising, in combination, a plug conduit unit having a sealing member composed of anode rubber to provide a fluid-tight joint and a socket unit having means cooperating with means on said plug unit and acting to positively secure parts of said units against relative rotary movement to prevent injury to said sealing member.

14. A fluid pressure-sealed type conduit coupling comprising, in combination, a plug conduit unit including a tubular shell having on the inside of one end thereof a threaded portion, said shell also having a shoulder facing said threaded portion, a tubular sealing element composed of anode rubber having a flange seated on said shoulder, means engaging the flange of said sealing element to provide a fluid-tight joint, a valve having a tubular valve stem extending into said sealing element, said stem having at least one radial opening adjacent said valve, a spring urging said valve toward closed position, a nipple threaded into said shell and engaging said spring and permitting unrestricted fluid flow when the valve is open, and a socket unit including a tube and a rotary ferrule secured to said tube, said tube being adapted to be axially inserted into said tubular shell to provide an annular fluid-sealing contact with the free annular end portion of said sealing element, and said tube also having an internal shoulder for engaging and moving said tubular valve stem against the force of said spring to open said valve to permit unrestricted fluid flow through said radial opening when said units are coupled; said shell being provided with means for quick connection with said ferrule to secure the units in coupled relation against the force of said spring.

15. A conduit coupling comprising, in combination, a socket conduit unit; a plug conduit unit readily attachable to and detachable from said socket unit; one of such units including a substantially tubular casing and a tubular elastic sealing element having one annular end thereof secured in sealing contact with the interior surface of said casing; the other of such units including a tube having an internal annular seat within the bore of said tube, said internal seat being constructed and arranged to surround and engage an annular external surface portion adjacent the other end of said sealing element to provide a fluid-tight joint between said sealing element and said tube when said units are coupled together; said units having cooperating interlocking means operable to prevent rotation of said tube relatively to said sealing element when said internal seat in said tube engages said external surface portion of said sealing element.

16. A conduit coupling as claimed in claim 15, wherein a normally-closed valve is disposed within one of said units, and a tubular stem for actuating said valve extends axially through said tubular sealing element and axially into the bore of said tube.

JAMES ARTHUR HOFFMAN.
SAMUEL R. OLDHAM.
WILGOT J. JACOBSSON.